United States Patent
Srinivasan et al.

(10) Patent No.: US 7,836,492 B2
(45) Date of Patent: Nov. 16, 2010

(54) USER AUTHENTICATION SYSTEM LEVERAGING HUMAN ABILITY TO RECOGNIZE TRANSFORMED IMAGES

(76) Inventors: Sudharshan Srinivasan, 5496 Golubin Common, Fremont, CA (US) 94555; Jai Kumar, 20360 Clifden Way, Cupertino, CA (US) 95014; Kothandraman Ramchandran, 45426 Potawatami Dr., Fremont, CA (US) 94539

( * ) Notice: Subject to any disclaimer, the term of this patent is extended or adjusted under 35 U.S.C. 154(b) by 1064 days.

(21) Appl. No.: 11/583,757

(22) Filed: Oct. 18, 2006

(65) Prior Publication Data
US 2007/0094717 A1    Apr. 26, 2007

Related U.S. Application Data

(60) Provisional application No. 60/729,080, filed on Oct. 20, 2005.

(51) Int. Cl.
G06F 12/14    (2006.01)

(52) U.S. Cl. .................. 726/6; 726/5; 726/21; 726/28; 713/193

(58) Field of Classification Search .......... 726/5, 726/6, 21, 28; 713/193
See application file for complete search history.

(56) References Cited

U.S. PATENT DOCUMENTS

| | | | | |
|---|---|---|---|---|
| 5,276,314 | A * | 1/1994 | Martino et al. | 340/5.27 |
| 5,559,961 | A * | 9/1996 | Blonder | 726/18 |
| 5,815,083 | A * | 9/1998 | Patarin et al. | 340/5.27 |
| 6,192,478 | B1 * | 2/2001 | Elledge | 726/18 |
| 6,209,102 | B1 * | 3/2001 | Hoover | 726/18 |
| 6,434,702 | B1 * | 8/2002 | Maddalozzo et al. | 726/17 |
| 6,720,860 | B1 * | 4/2004 | Narayanaswami | 340/5.54 |
| 6,980,081 | B2 * | 12/2005 | Anderson | 340/5.53 |
| 7,174,462 | B2 * | 2/2007 | Pering et al. | 713/182 |
| 7,219,368 | B2 * | 5/2007 | Juels et al. | 726/2 |
| 7,451,323 | B2 * | 11/2008 | Abe et al. | 713/183 |
| 2004/0030934 | A1 * | 2/2004 | Mizoguchi et al. | 713/202 |
| 2004/0093527 | A1 * | 5/2004 | Pering et al. | 713/202 |
| 2004/0225880 | A1 * | 11/2004 | Mizrah | 713/155 |
| 2005/0010768 | A1 * | 1/2005 | Light et al. | 713/168 |
| 2005/0144484 | A1 * | 6/2005 | Wakayama | 713/202 |

FOREIGN PATENT DOCUMENTS

WO    WO 0233882 A1 *  4/2002

OTHER PUBLICATIONS

Jermyn et al., "The Design and Analysis of Graphical Passwords," Proceedings of the 8th USENIX Security Symposium, USENIX Association, Aug. 23-26, 1999, pp. 1-15, Washington, D.C., USA.*

(Continued)

*Primary Examiner*—Michael Pyzocha
*Assistant Examiner*—Tamara Teslovich

(57) ABSTRACT

An authentication system combining human image recognition capability to recognize transformed images, image transform element (41), and image storage element (38), and image display element (40), is implemented to enable user (32) to access a secure resource (31). Said authentication system provides a mass market solution that does not require expensive capital to implement and cannot be compromised as other authentication methods in prior art.

18 Claims, 4 Drawing Sheets

OTHER PUBLICATIONS

Dhamija et al., "Deja Vu: A User Study Using Images for Authentication," Proceedings of the 9th USENIX Security Symposium, USENIX Association, Aug. 14-17, 2000, pp. 1-15, Denver, Colorado, USA.*

"PKI and Passfaces—Synergistic or Competitive?," Real User Personal Authentication Online, Real User Corporation, Oct. 2001, pp. 1-14, Washington, D.C., USA.*

"Passface instead of Password", The Hindu, online edition of India's National Newspaper, Business Section, Jan. 10, 2002.*

Alexandria Robbins, "Face it", PC Magazine, Jun. 12, 2001.*

T. Perng et al., "Photographic Authentication through Untrusted Terminals", IEEE Pervasive Computing, vol. 2, Issue 1, Jan. 2003, pp. 30-36.*

* cited by examiner

USER AUTHENTICATION SYSTEM LEVERAGING HUMAN ABILITY TO RECOGNIZE TRANSFORMED IMAGES

CROSS REFERENCE TO RELATED APPLICATIONS

This is the utility patent of provisional Patent Application U.S. 60/729,080 with a priority date of Oct. 20, 2005.

BACKGROUND OF THE INVENTION

1. Field of Invention

The present invention generally relates to authentication methods that enable access to secure resources and specifically to authentication methods that leverage human image recognition capabilities to recognize transformed images.

2. Prior Art

User authentication methods have existed for a number of years and are broadly categorized into password authentication, biometric authentication and psychometric authentication methods. All these methods can be compromised by a determined unauthorized user who can assume false identities. False identities can be acquired by getting access to passwords, or acquiring biometric signatures or repeated learning of patterns of decision making of another individual. These false identities can lead to unauthorized access. Commercial viability of authentication systems is also an important factor in mass market adoption. Most biometric authentication methods involve expensive capital investment and hence cater to special purpose applications only.

Password authentication methods have several limitations including forgotten passwords, stolen passwords, aging passwords and multiple passwords. Humans tend to forget passwords that are not used for long periods of time. This will result in denial of access to a secure resource when necessary. Passwords can be easily stolen by attacks such as man in the middle attack, where passwords are intercepted in communication element and reused to assume identities. Passwords can also be stolen by a casual observer in proximity to the user being authenticated. The casual observer may use camera phones or any recording device to record passwords that are perceptible to recording systems while a user may be using a password to get access to a secure resource. Most systems have aging methods that prompt users to change passwords periodically. This in turn leads to multiple passwords per user which adds to difficulty of maintaining several passwords for plurality of accounts associated with secure access.

Biometric authentication methods use human biological signatures including fingerprint, voice print, facial heat print, iris scan etc. to authenticate a user. These signatures can be copied to assume false identities although with additional cost as compared with password thefts. Biometric sample acquisition systems used in such systems are usually expensive and not portable. Human aging process contributes to changing biometric signatures and hence samples may have to be reacquired periodically. Due to these limitations, no known biometric authentication method can guarantee one hundred percent reliability and hence such systems are never used exclusively to authenticate a user. Biometric systems are usually used in conjunction with other methods including password protection.

Psychometric authentication methods use personal decision making characteristics to distinguish users. These methods depend on a user's ability to make similar decisions at repeated intervals. But these systems are not foolproof and often deny access to legitimate users due to forgetfulness or a different state of mind of a user.

It can be seen that, each of the above mentioned categories suffer from identity theft problems although the cost to acquire such false identities may vary substantially. Hence there is a need for a new authentication system that provides authentication methods to overcome above mentioned identity theft problems and is commercially viable to be used in all applications that need user authentication.

Following paragraphs in the current section describe relevant prior art in this field.

U.S Doc 20020190124 proposes voice based identification method for verifying credit and debit card transaction. When users attempt to access one or more services, they are prompted by Point-of-Sale (POS) terminals to provide voice samples to be sent to service provider and verified against pre-stored voice samples in a database. This identification method is called Voice verification. Voice verification may fail if the user's voice is affected due to recent illness or ambient noise.

US Doc 20020040926 proposes a method to use video phones as surveillance devices to perform geometric or color based code sheet comparisons for controlling access. The code sheet based comparisons are limited to capture and compare fixed patterns and colors, such as bar code or article color and placement. This method does not prevent an unauthorized user to gain access by using card or an article that contains the image matching the code sheet.

Prior art U.S. Pat. No. 6,720,860 proposes a wristwatch based device that is capable of wirelessly accessing information from the network. The Wristwatch device generates a sequence of one or more images for display via a user interface. This sequence of images, including user password elements, are flashed randomly at different user interface locations and varied temporally. The above method ensures that it is impossible for an unauthorized user who is watching only an authorized user's finger responses, to intrude the system. But this prior art method can be broken into if both finger responses and corresponding password locations displayed in user interface are recorded and replayed.

Prior art U.S. Pat. No. 6,657,538 proposes a method that stores biometric information such as body images in mobile phone Subscriber Identity Module (SIM) card and biometric server. If the SIM card is placed in a phone with video sensor capability, the service access is permitted when biometric data captured by video sensor in the phone matches biometric information stored in the SIM card. This method also suffers from disadvantages listed earlier such as, biometric based systems are expensive to build and their use is limited to certain applications.

Prior art U.S. Pat. No. 6,556,127 proposes voice verification to perform authentication. Lack of voice verification accuracy is addressed by making users to enter Personal Identification Number (PIN) number. This method also faces similar challenges enlisted under biometric verifications above.

Prior art U.S. Pat. No. 5,971,272 proposes secure personal identification number based authentication method. It addresses several security issues such as unauthorized user stealing password by watching user's keystrokes, guessing the password by repeated attempts and man-in-the-middle attack when the password is transported through communication media. But it calls for a user to perform secure personal identification number (SPIN) translation, whenever the user is trying to gain access to system. If the number translation is too trivial, it is vulnerable to be compromised and if it is too complex, it is beyond the reach of ordinary users. SPIN translation in general, makes this system less user friendly. Whereas, if SPIN translation is done by a computer, then the computer needs to store the master personal identification number (MPIN) and any unauthorized user having access to the computer will be able to compromise security.

Prior art U.S. Pat. No. 5,821,871 proposes person-specific psychometric information (PSPI) based authentication method. PSPI may be in the form of images, symbols, text or sound. PSPI may be presented and subsequently grouped together to generate a code which is compared with a code stored permanently. This prior art increases the level of security by using person specific psychometric information and organizing into two sets of information. One set is presented in a pre-determined order and the next set is presented in a random order. The user of this authentication method has to create a mapping between the two sets in order to create appropriate authentication codes to be granted access. If this mapping is captured by a video camera, then each of mappings stored in this authentication system can be reused and in due course of time all correct mappings could be recorded unless new mappings are added periodically.

Prior art US Doc 20040093527 expects a user to identify familiar photographs in a set of photographs that may contain both familiar and unfamiliar photographs. This system can be compromised over a period of time if all user correct responses from a user are recorded and replayed.

As can be seen from above, all known prior arts suffer from identity theft problems to varying degrees. Hence there is a need for an authentication system that is superior to existing solutions.

BACKGROUND OF THE INVENTION

Objects and Advantages

Accordingly, several objects and advantages of the present invention are:
a) to provide an authentication system that minimizes identity theft problems;
b) to provide an authentication system that scales to all applications for mass market adoption;
c) to provide an authentication system that does not mandate periodic renewal of recorded information;
d) to provide an authentication system that is easy and quick to use; and
e) to provide an authentication system that can be used across a range of portable and not portable devices.

SUMMARY

In accordance with present invention, an authentication system combining human image recognition capability to recognize transformed images, one way image transform engine, image storage and image display engine is implemented to address above mentioned identity theft problems and provide a mass market solution.

Human beings have limitations in remembering multiple passwords made with digits and alphabets. But human beings can recognize multiple images familiar to them even if these images may have undergone transformations such as skewing, stretching, rotation, color change, blurring, cropping and blending. This is due to the fact that human beings can reverse many transformations on familiar images using their image recognition capabilities. This reverse transformation is extremely expensive for a computer to implement and in most cases may be impossible. Hence combining several such image transforms, an authentication system, is implemented that will be very expensive to break into.

Image transforms when combined in specific orders can yield irreversible transformations also called one way transformations. For example, if a color image with twenty four bits of color is transformed using a two hundred and fifty six color cube to a eight bit color image, and then this eight bit color image is again transformed into a twenty four bit color image, the original twenty four bit color image and the transformed twenty four bit color image will not be bitwise identical. Hence it is impossible to reverse transform the transformed image to original image.

Similarly, if a one way skew function skews an image in multiple directions, it will be very compute intensive for a computer algorithm to generate back the original image from skewed image.

This method of using human image recognition capability for an authentication system would have been extremely difficult in past due to unavailability of mass market image capture elements.

But with advent of cheap cellular camera phones and digital cameras, image capture and storage has become routine activity for the mass market that enables any user to capture and setup an image recognition based authentication system with relative simplicity.

Given these parameters, it can be seen that combining human image recognition capability to recognize transformed images, one way image transform engine, image storage, and display engines will provide an unobvious result of reliable and commercially viable user authentication system for mass market adoption.

DRAWINGS

Figures

Figure 1:
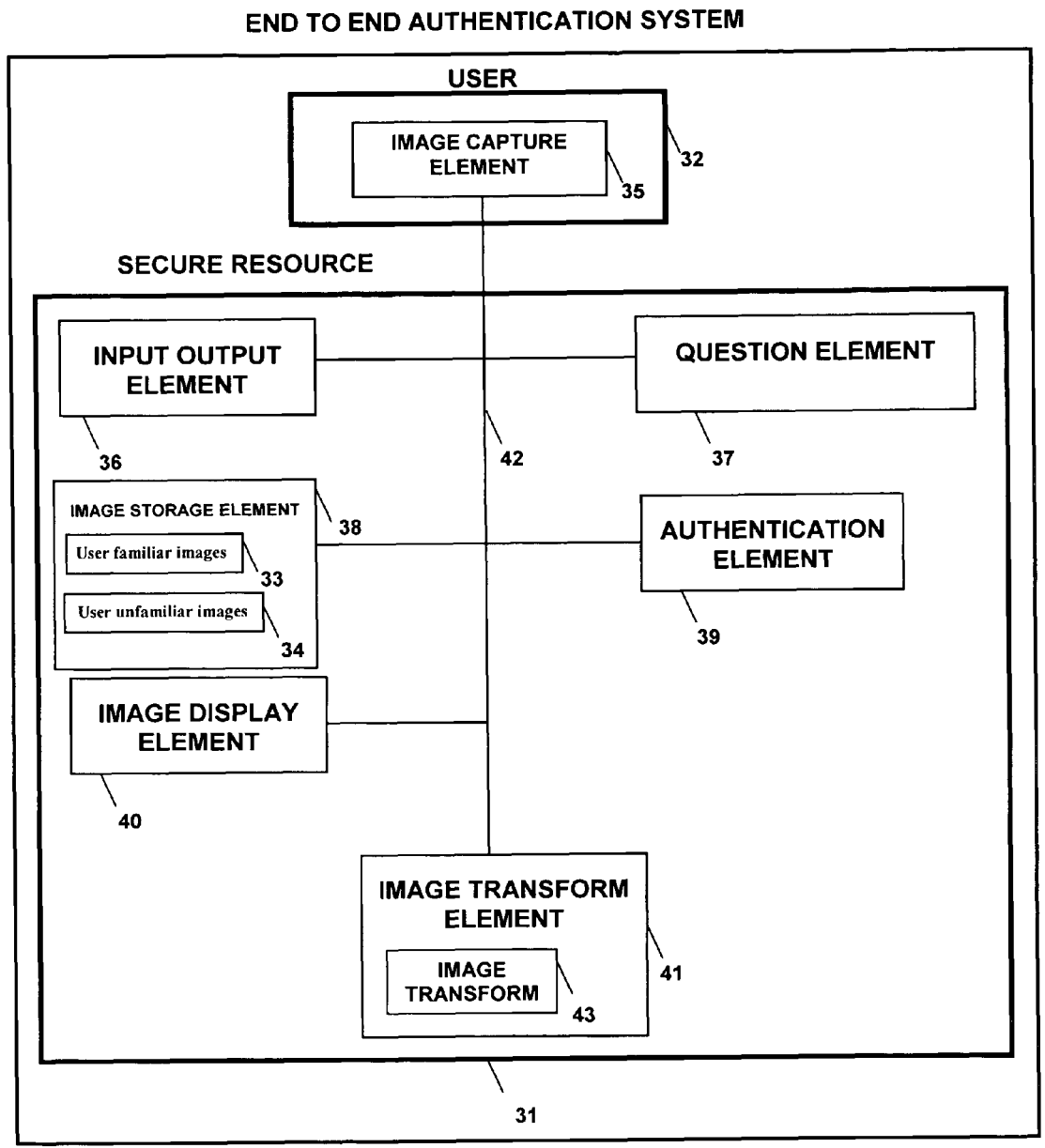
FIG. 1 shows an end to end authentication system associated with secure resource in accordance with present invention.

REFERENCE NUMBERS 31 secure resource
32 user
33 user familiar images
34 user unfamiliar images
35 image capture element
36 input and output element
37 question element
38 image storage element
39 authentication element
40 image display element
41 image transform element
42 data communication element
43 image transform
44 step
45 step
46 step
47 step 48 step
49 step
50 step
51 step
52 step
53 step
54 step
55 step
56 step
57 step
58 step
59 step
60 step
61 step
62 step
63 step
64 step
65 step
66 authentication device
67 device image storage element
68 device image display element
69 device image transform element
70 device input and output element
71 device question element
72 device authentication element
73 device external communication element
74 device processor element
75 device image transform
76 device data communication medium

DETAILED DESCRIPTION OF PREFERRED EMBODIMENT

FIG. 1 shows an end to end authentication system in accordance with present invention.

This authentication system is comprised of two basic elements. A resource that needs protection from unauthorized access is referred herein as secure resource 31. A user that needs access to secure resource 31 is herein referred to as user 32.

The following is an overview of authentication system of present invention. User 32 is presented with a set of images that are transformed from original images into transformed images using commonly available image processing algorithms. Such algorithms are herein referred to as image transforms. Specifics of image transforms are described in further detail in paragraph about image transform element of this authentication system.

The set of transformed images may contain images that are familiar to user herein referred to as user familiar images 33 and images that are not familiar to user herein referred to as user unfamiliar images 34.

The original images are transformed just enough such that the original images are still recognizable by a human being but is not easily computable by conventional computers. User 32 is then asked questions about presented set of transformed images. The number of correct answers provided by user 32 is used to decide whether an access to secure resource 31 can be granted.

The key to this invention is to be able to leverage human intelligence that enables any human being to reverse transform a transformed image to its original form in his/her mind. This cannot be replicated by any known computer or software algorithm in state of the art.

The following paragraphs first describe each of the parts of this authentication system and then all parts are interconnected to show the workings of this authentication system.

User 32 is any user who needs access to secure resource 31 that is protected by this authentication system. User 32 is any human being but may also be any intelligent animal capable of recognizing transformed images familiar to them. User 32 is associated with an image capture element 35 which may be optionally used for capturing images of objects that are familiar to a user. Such images are referred to as user familiar images 33 as noted above. User 32 may obtain user familiar images 33 through other means as well.

Secure resource 31 is a logical entity that needs protection from unauthorized access. This resource may have a physical form but is not a mandatory requirement of this authentication system. Some examples of secure resource 31 are bank account, local computer, remote computer, cellular phone, secure building, home, office, secure vault, secure locker room, box with lock, automobile, dwelling with lock, secure area in building, automated teller machine and internet account. Present invention enables protection of any entity that needs protection and hence the above list should not be treated as exhaustive but is merely an illustration.

Secure resource 31 is associated with elements of this authentication system defined as input and output element 36, question element 37, image storage element 38, authentication element 39, image display element 40, image transform element 41 and data communication element 42. These elements associated with secure resource 31 are logical entities and may be implemented in hardware, software or as a combination and may be separate or built in as part of secure resource 31.

Image storage element 38 enables storage of images that are transformed and not transformed. These images can be user familiar images 33 and user unfamiliar images 34. User familiar images 33 may be captured by use of associated image capture element 35 or other means of acquiring images may also be used. It is not essential for image storage element 38 to store original images but just transformed versions of each image may be stored. This prevents accidental thefts of original images from image storage element 38 thereby contributing to increased effectiveness of this authentication system. Image storage element 38 also stores the mapping between user 32 and corresponding user familiar images 33. This mapping is kept encrypted and separate from the set of familiar and unfamiliar images.

Any data storage means can be used to implement image storage element 38. Some examples of data storage means are read write flash, read write floppy disk, read write hard disk, read write tape, read write compact disc, read write optical disc and read write digital video disc.

Image transform element 41 stores at least one image transform 43. Each image transform 43 enables transformation of images into related images using image processing algorithms. Such transformation can be categorized into irreversible image transforms and reversible image transforms. Irreversible image transforms yield transformed images such that the original image cannot be recreated using only transformed image and commonly available computing power. For the purposes of this invention, both kinds of image transforms may be used in sequence or any combination thereof and are herein referred to as image transforms. Some of image transforms that can be used are stretch transform, skew transform, rotate transform, blend transform, shear transform, twist transform, crop transform, contour transform, color map transform, color swap transform, dither transform, blur transform, emboss transform, sharpen transform, fade transform and color space convert transform. Note that the list of transforms mentioned is just a representative set and by no means an exhaustive set of transformations that may be applied to an image. Any image transform that by itself or in combination with another image transform leads to an image that is irreversible to original image may be used as part of this invention.

Image display element 40 enables display of images to user 32. Image display element uses one or more peripherals that interact with user 32. Peripherals that can be used are liquid crystal display, organic light emitting diode display, plasma display, picture tube display, projector display and other displays capable of displaying transformed images.

Input and output element 36 enables two way interaction with user 32. Interaction may be in form of textual, audio and cursor based input and output. Peripherals used in image display element 40 may be reused in input and output element 36 as well. User 32 is asked questions in the form of text or audio and reply from user 32 may be one or more of text, audio and cursor input. Input and output element 36 uses one or more peripherals to interact with user 32. Peripherals that can be used are keyboard, pointing device, touch sensitive display, microphone, speaker, liquid crystal display, organic light emitting diode display, plasma display, picture tube display and projector display.

Question element 37 stores a list of questions user 32 has to answer to get access to secure resource 31. These questions are communicated to user 32 using input and output element 36. These questions are organized to collect information about transformed images such that the answers do not reveal the identity of user familiar images 33. That is, user 32 is never asked to point to recognizable transformed images that are familiar. Given that direct information is never exposed about transformed images, and the images shown to user are transformed, it is impossible for anyone to record user responses and play back such recorded responses to break into this authentication system.

Questions in question element 37 can be one of how many images are recognized in shown set of images, how many images recognized have their color changed, how many images recognized have been stretched vertically, how many images recognized have been stretched horizontally, how many images recognized are skewed, how many images recognized are rotated, how many images recognized are blended with other images, how many images recognized are sheared, how many images recognized are twisted, how many images recognized are cropped, how many images recognized are contoured, how many images recognized are color mapped, how many images recognized are color swapped, how many images recognized are dithered, how many images recognized are blurred, how many images recognized are embossed, how many images recognized are sharpened and how many images recognized are faded.

Note that the list of questions mentioned here is just a sample and should not be construed as an exhaustive list. Any question that is asked on set of transformed images without user having to directly identify user familiar images 33 should be treated as part of questions in question element 37.

Authentication element 39 uses question element 37 to get questions that that are presented to user 32 using input and output element 36. Answers to questions are collected and processed by authentication element 39 and are tested for correctness. The number of correct answers to allow access to secure resource 31 and the number of wrong answers to deny access to secure resource 31 are configurable.

The above concludes description of each of the elements of this authentication system. The following paragraphs show a typical scenario of interaction among various elements to form a working authentication system.

First, image storage element 38 associated with secure resource 31 is loaded with user familiar images 33. Then user unfamiliar images 34 are also loaded into image storage element 38. These images are transformed using image transform element 41 that uses one or more image transforms 43 to achieve corresponding image transformations.

When user 32 needs access to a secure resource 31, image authentication element 39 produces a set of transformed images using a combination of image transform element 41, one or more image transforms 43 and a set of images from image storage element 38 and displays these transformed images to user 32 using image display element 40.

Image authentication element 39 uses information that is only accessible to itself to determine whether an image used in transformation is familiar to user 32 or not.

These transformed images are then displayed to user 32 using image display element 40. This set of transformed images that is presented to user may contain both user familiar images 33 and user unfamiliar images 34. User familiar images 33 are always presented in transformed form to protect their identity but user unfamiliar images 34 may be presented in original or transformed forms.

The mapping between user familiar images 33 being presented and transformations that are applied to any image are randomly setup for each set of images being displayed, thereby avoiding any additional storage for such a mapping and corresponding security issues to protect this information. This mapping is known only to authentication element 39.

Also, sufficient precaution is taken to avoid exposing bits in memory of authentication element that is aware of this mapping. Techniques such as encryption, obfuscation and bit spreading may be used to protect this mapping.

Authentication element 39 then uses question element 37 to get questions that are to be presented to user 32 about set of images that are shown in display element 40. These questions are displayed using input output element 36.

Authentication element then receives answers to presented questions using input and output element 36. These answers are then processed by authentication element 39 to determine their correctness. Authentication element 39 can be configured to expect a minimum number of correct answers. If desired number of correct answers is received, then user 32 is granted access to secure resource 31 else user 32 is denied access to secure resource 31.

Communication between each of the elements mentioned is using data communication element 42. Data communication element 42 provides connectivity among mentioned elements and this communication can be constrained to within a single hardware or across hardware and software. Hence this communication can be one of interchip communication and intersoftware communication.

The above concludes the description of authentication system in accordance with present invention.

Below are descriptions of figures for specific methods used in this authentication system.

Figure 2:
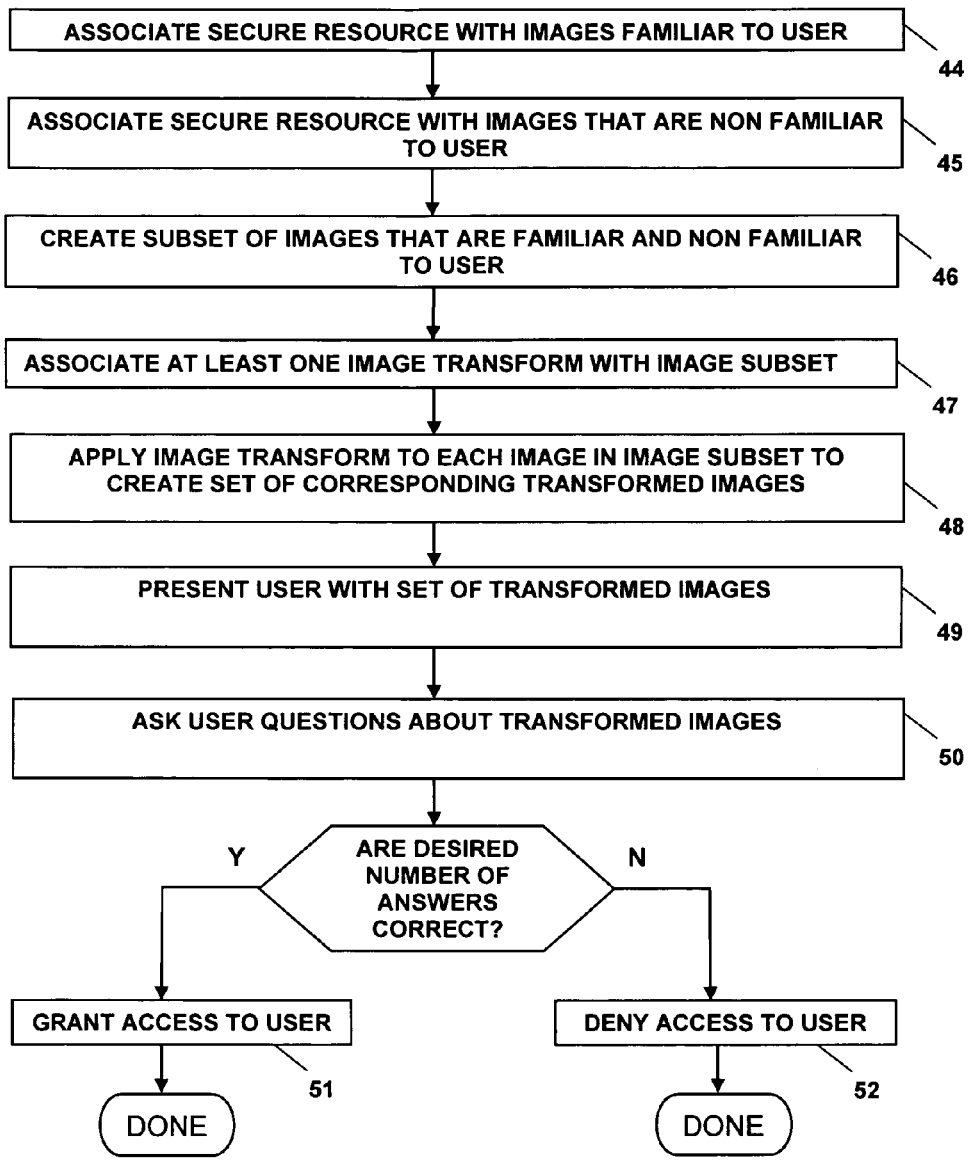
FIG. 2 shows a flow chart of a basic image authentication method of authentication system in accordance with present invention.

FIG. 2 shows a flow chart of method that describes basic image authentication method in accordance with present invention. In step 44 secure resource 31 is associated with user familiar images 33. In step 45 secure resource 31 is associated with user unfamiliar images 34. In step 46 a subset of images is created that with user familiar images 33 and user unfamiliar images 34. In step 47 at least one image transform 43 is associated with this subset of images. In step 48 at least one image transform 43 is applied to each image in this subset to create a set of transformed images. In step 49 user 32 is presented with a set of transformed images. In step 50 user 32 is asked questions about images in the set of transformed images such that correct answers correspond to user familiar images 33. In step 51 user 32 is granted access to secure resource 31 if desired number of answers to said questions is correct. In step 52 user 32 is denied access to secure resource 31 if desired number of answers provided is not correct.

Figure 3:
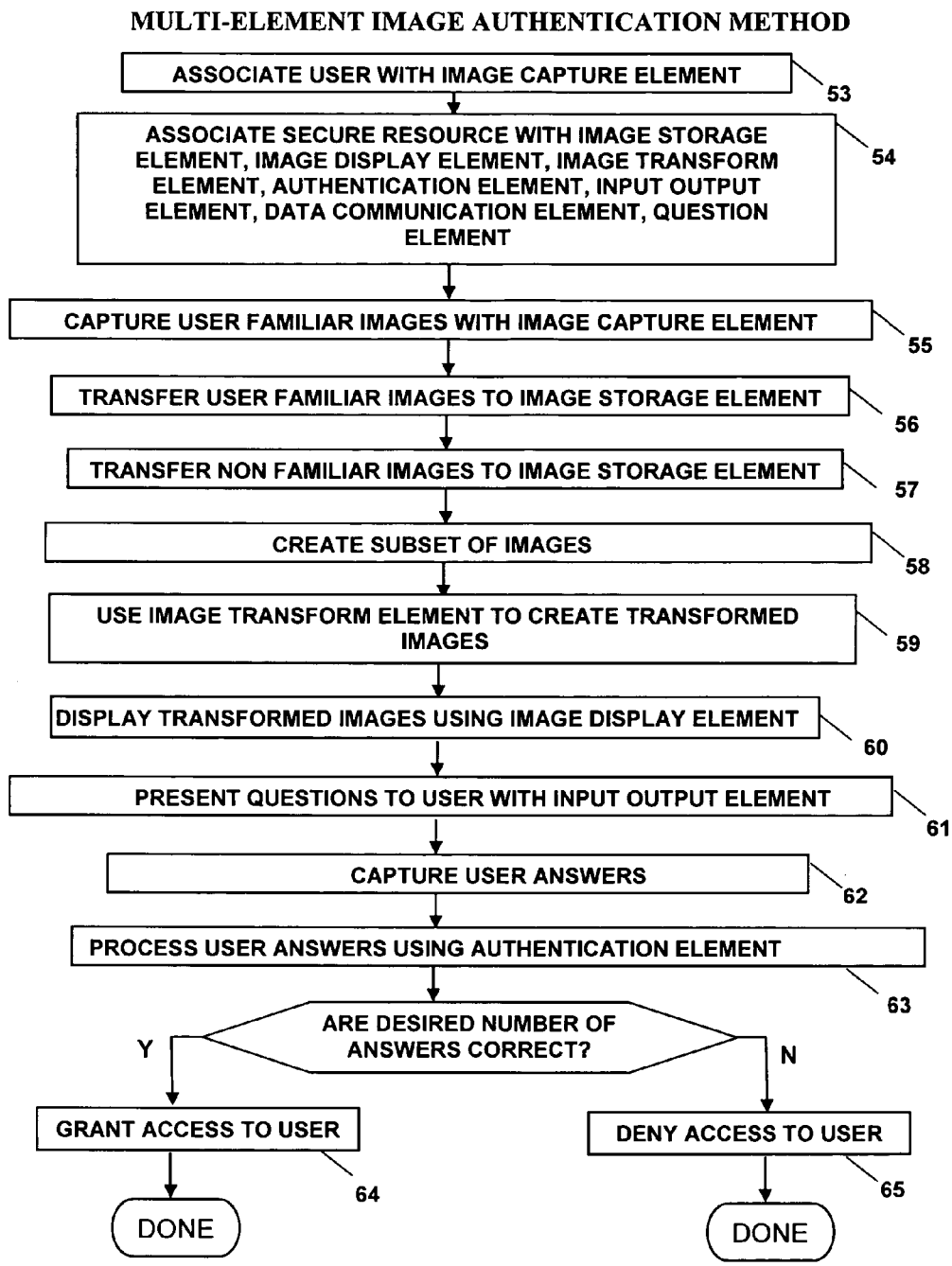
FIG. 3 shows a flow chart of image authentication method that is implemented using multiple elements of authentication system in accordance with present invention.

FIG. 3 shows a flow chart of method that uses multiple elements to achieve the functionality of this authentication system herein referred to as multiple element image authentication method in accordance with present invention.

In step 53 user 32 is associated with image capture element 35.

In step 54 secure resource 31 is associated with all elements of this authentications system listed as image storage element 38, image display element 40, image transform element 41 authentication element 39, input and output element 36 data communication element 42 and question element 37.

In step 55 user familiar images 33 are captured with image capture element 35.

In step 56 user familiar images 33 images are transferred to image storage element 38 using data communication element 42. In step 57 user unfamiliar images 34 are transferred to image storage element 38 using data communication element 42. User unfamiliar images 34 images may be captured using any standard image capture method In step 58 images from image storage element 38 are used to create subset of images.

In step 59 set of transformed images is created by applying at least one image transform 43 to each image in this subset.

In step 60 this set of transformed images is displayed on image display element 40.

In step 61 question element 37 is used by authentication element 39 to present questions based on images in set of transformed images into input and output element 36.

In step 62 answers by user 32 are captured using input and output element 36.

In step 63 these answers are processed using authentication element 39 to determine if answers are correct.

In step 64 user is granted access if desired number of answers are correct.

In step 65 user is denied access if desired number of correct answers is not provided by user.

The above concludes description of specific methods used in this authentication system.

Figure 4:
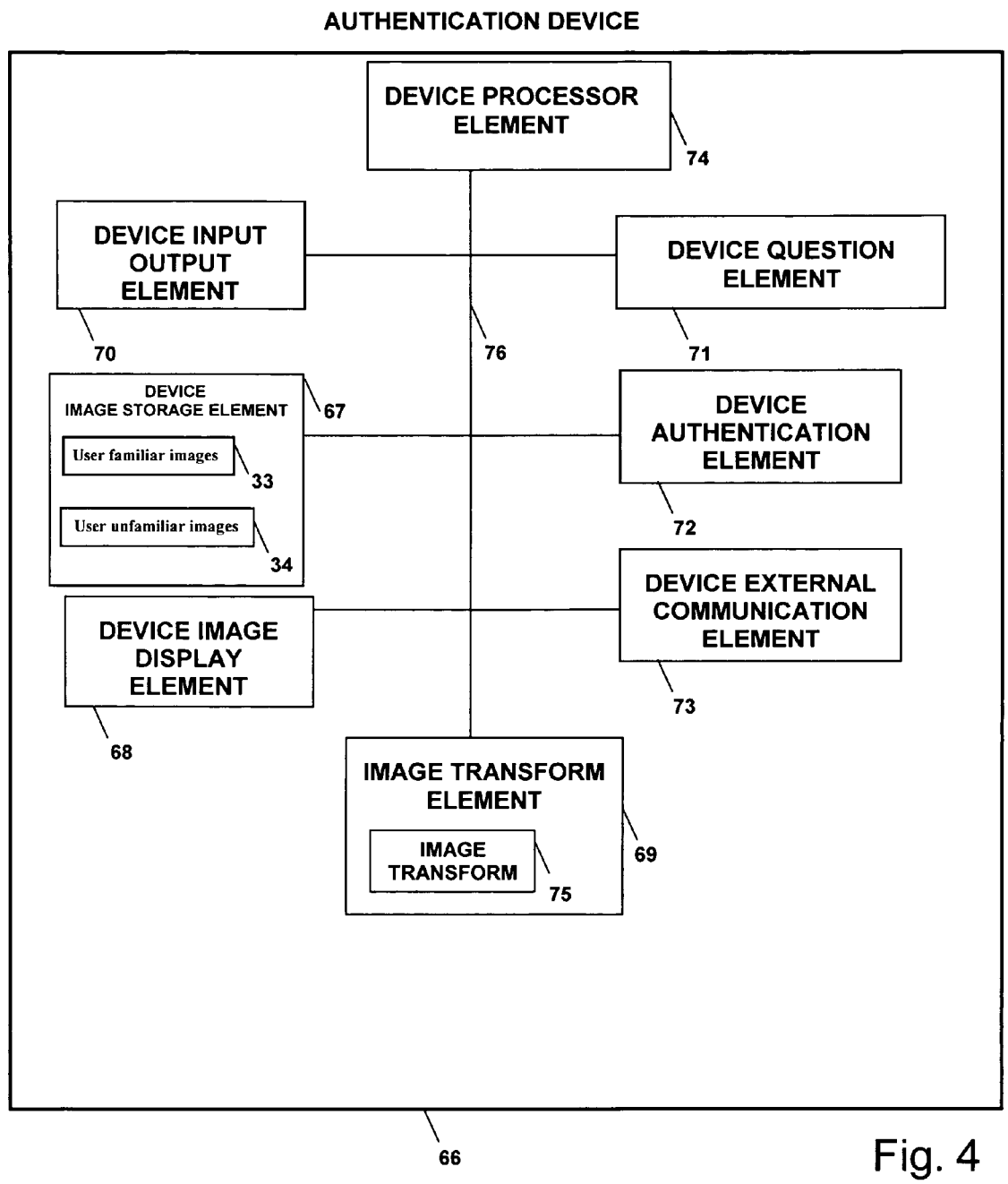
FIG. 4 shows an authentication device in authentication system in accordance with present invention.

FIG. 4 shows authentication device 66 in accordance with present invention. This device can be used to authenticate a user and communicate with external entity the result of such authentication. The result that is sent to external entity could be any meaningful message that may be encrypted.

This authentication device has all the elements of authentication system of present invention as described above with an additional element that enables external communication.

For purpose of clarity, all elements associated with this device are prefixed with word device in further description.

Authentication device 66 has elements listed as device image storage element 67, device image display element 68, device image transform element 69, device input and output element 70, device question element 71, device authentication element 72, device data communication element, device external communication element 73 and device processor element 74.

Device 66 is used by user 32 to get access to secure resource 31. Device 66 can be a portable device and may be a part of another device such as a portable cellular phone. Elements excluding processor element 74 listed in device 66 may be implemented as software or hardware elements. If they are implemented in software then they are implemented on processor element 74.

Device 66 is associated with secure resource 31 that is separate from this device. All functionality to authenticate user 32 is embedded in this device. This device can be configured for a single user use or multiple user use. In case this device is programmed for single user use, this device will have all user familiar images 33 and user unfamiliar images 34. When this device is configured for multiple user use, this device will contain images for different users.

These images will be used by device authentication element 72 to generate transformed images that are presented to user 32 using device display element 68. Device authentication element 72 uses device image transform element 69 and some device image transform 75 to generate these transformed images. Device authentication element 72 then uses device question element 71 to get questions about presented transformed images and presents these questions to user 32 using device input and output element 70. Answers to these questions are received using device input and output element 70. These answers are then processed by device authentication element 72 to decide if user 32 can be granted access. If user 32 can be granted access, then a authentication code is generated and transmitted securely using external communication element 73. This authentication code may be processed by another system that is also associated with secure resource 31 and it is the responsibility of the other system to finally decide if user 32 can be granted access to secure resource 31.

All communication inside device 66 is done using device data communication medium 76. Device data communication medium 76 can be implemented as software or hardware based on the needs of other elements of this device.

ADVANTAGES

From the description above a number of advantages of this authentication system become evident:

a) Identity theft rate is dramatically reduced in this authentication system.

b) This authentication system can scale to all kinds of applications and is not isolated to expensive installations.

c) Periodic renewal of recorded information is unnecessary as a few images can produce several transformations and combinations that can be used for several years without being compromised d) The authentication process is quick and easy without having to remember several passwords and fear of losing such passwords.

e) This authentication system can be used in portable and not portable devices thereby enabling mass market use.

CONCLUSION, RAMIFICATIONS AND SCOPE

Accordingly, the reader will see that combining human image recognition capability to recognize transformed images and image transformations provides the most reliable and commercially viable user authentication system for mass market adoption.

Although the description above contains much specificity, these should not be construed as limiting the scope of invention but merely as providing illustrations of some of the presently preferred embodiments of this invention. Thus the scope of this invention should be determined by appended claims and their legal equivalents, rather than by example given.

We claim:

1. A method to authenticate a user to enable access to a secure resource, said method comprising: presenting said user with a set of transformed images in a computer display associated with said secure resource, wherein said set comprises images that are familiar to said user and images that are not familiar to said user; asking said user questions about said set of transformed images such that answers to said questions do not reveal identity of said familiar images; and associating said answers with authentication of said user to enable access to said secure resource.

2. The method to authenticate said user of claim 1, further comprising: associating said secure resource with images that are familiar to said user, herein referred to as user familiar images; associating said secure resource with images that are not familiar to said user, herein referred to as user unfamiliar images; creating a subset of images comprising plurality of said user familiar images and plurality of said user unfamiliar images; associating at least one image transform with said subset of images; applying at least one of said image transforms to at least one image in said subset of images to create a set of transformed images; presenting to said user said set of transformed images; asking said user questions about images in said set of transformed images such that answers to said questions do not reveal identity of said familiar images; granting to said user, access to said secure resource, if desired number of said answers is correct; and denying to said user, access to said secure resource, if desired number of said answers is wrong.

3. The method to authenticate said user of claim 2, further comprising: associating said user with an image capture element; associating said secure resource with image storage element, image display element, image transform element, authentication element, input and output element, data communication element, and question element; capturing said user familiar images using said image capture element; transferring said user familiar images into said image storage element using said data communication element; using images from said image storage element to create said subset of images; using said image transform element for said application of at least one of said image transforms to each image in said subset of images to create said set of transformed images; using said image display element for said presentation of said set of transformed images; using said question element to generate said questions about images in said set of transformed images; using said input and output element for said presentation of said questions; capturing said answers from said user in response to said questions using said input and output element; and processing said answers using said authentication element to authenticate said user.

4. The method to authenticate said user of claim 2, wherein said secure resource is selected from group consisting of bank account, local computer, remote computer, cellular phone, secure building, home, office, secure vault, secure locker room, box with lock, automobile and dwelling with lock and secure area in building and automated teller machine, and internet account.

5. The method to authenticate said user of claim 2, wherein said image transform is selected from group consisting of stretch transform, skew transform, rotate transform, blend transform, shear transform, twist transform, crop transform, contour transform, color map transform, color swap transform, dither transform, blur transform, emboss transform, sharpen transform, fade transform, and color space convert transform.

6. The method to authenticate said user of claim 2, wherein said question is selected from group consisting of how many images are recognized, how many images recognized have their colors changed, how many images recognized have been stretched vertically, how many images recognized have been stretched horizontally, how many images recognized are skewed, how many images recognized are rotated, how many images recognized are blended with other images, how many images recognized are sheared, how many images recognized are twisted, how many images recognized are cropped, how many images recognized are contoured, how many images recognized are color mapped, how many images recognized are color swapped, how many images recognized are color space converted, how many images recognized are dithered, how many images recognized are blurred, how many images recognized are embossed, how many images recognized are sharpened, and how many images recognized are faded.

7. The method to authenticate said user of claim 3, wherein said image capture element is selected from group consisting of digital camera, cellular phone with digital camera, digital image scanner, and digital video camera with still image capability.

8. The method to authenticate said user of claim 3, wherein said user familiar image is formed with images selected from group consisting personal photo, personal sketch, personal artwork, personal video, and personal document.

9. The method to authenticate said user of claim 3, wherein said image storage element is selected from group consisting of read write flash, read write floppy disk, read write hard disk, read write tape, read write compact disc, read write optical disc, and read write digital video disc.

10. The method to authenticate said user of claim 3, wherein said image display element selected from group consisting of liquid crystal display, organic light emitting diode display, plasma display, picture tube based display, and projector based display.

11. The method to authenticate said user of claim 3, wherein said image transform element is selected from group consisting of software running on general purpose processor, software running on programmable digital signal processor, software running on application specific digital signal processor, application specific integrated circuit, field programmable gate array, and programmable logic device.

12. The method to authenticate said user of claim 3, wherein said input output element is selected from group consisting of keyboard, pointing device, touch sensitive display, microphone, speaker, liquid crystal display, organic light emitting diode display, plasma display, picture tube display, and projector based display.

13. The method to authenticate said user of claim 3, wherein said data communication element is selected from group consisting of interchip communication, and intersoftware communication.

14. An authentication device used by a user to get access to a secure resource, said device comprising: a hardware processor capable of executing computer instructions; image storage for storing set of familiar and unfamiliar images of said user; image transform element to apply image transforms to said familiar and unfamiliar images to generate transformed images; image display to display said set of transformed images to said user; input and output unit to receive user input and present context sensitive questions; question element to generate questions about said transformed images such that answers to said questions do not reveal identity of said familiar images; and authentication element to authenticate said user based on received answers to said questions.

15. The authentication device of claim 14, wherein said image storage is selected from group consisting of read write flash, read write floppy disk, read write hard disk, read write tape, read write compact disc, read write optical disc, and read write digital video disc.

16. The authentication device of claim 14, wherein said elements may be implemented on hardware processors selected from group consisting of general purpose processor, digital signal processor, programmable digital signal processor, application specific digital signal processor, application specific integrated circuit, field programmable gate array, and programmable logic device.

17. The authentication device of claim 14, wherein said image display is selected from group consisting of liquid crystal display, organic light emitting diode display, plasma display, picture tube based display, and projector based display.

18. The authentication device of claim 14, wherein said input output element is selected from group consisting of keyboard and pointing device and touch sensitive display, microphone, speaker, liquid crystal display, organic light emitting diode display, plasma display, picture tube display, and projector based display.

* * * * *